(12) United States Patent
Gash et al.

(10) Patent No.: US 6,818,081 B2
(45) Date of Patent: Nov. 16, 2004

(54) INORGANIC METAL OXIDE/ORGANIC POLYMER NANOCOMPOSITES AND METHOD THEREOF

(75) Inventors: Alexander E. Gash, Livermore, CA (US); Joe H. Satcher, Patterson, CA (US); Randy Simpson, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/626,098

(22) Filed: Jul. 23, 2003

(65) Prior Publication Data

US 2004/0198888 A1 Oct. 7, 2004

Related U.S. Application Data

(62) Division of application No. 10/186,468, filed on Jun. 28, 2002, now Pat. No. 6,712,917.

(51) Int. Cl.$^7$ .............................................. C06B 45/10
(52) U.S. Cl. ..................... 149/19.92; 524/431; 524/80
(58) Field of Search ..................... 149/19.92; 524/431, 524/80

(56) References Cited

U.S. PATENT DOCUMENTS

| | | | | |
|---|---|---|---|---|
| 5,629,380 A | * | 5/1997 | Baldwin et al. | 525/113 |
| 5,698,483 A | * | 12/1997 | Ong et al. | 501/12 |
| 5,726,247 A | * | 3/1998 | Michalczyk et al. | 525/102 |
| 5,788,950 A | * | 8/1998 | Imamura et al. | 423/263 |
| 5,840,796 A | * | 11/1998 | Badesha et al. | 524/449 |
| 5,962,608 A | * | 10/1999 | Ryang et al. | 526/89 |
| 6,183,852 B1 | * | 2/2001 | Rorabaugh et al. | 428/307.3 |
| 6,331,509 B1 | * | 12/2001 | Heimann et al. | 508/136 |
| 2002/0104599 A1 | * | 8/2002 | Tillotson et al. | 149/19.92 |

* cited by examiner

Primary Examiner—David W. Wu
Assistant Examiner—Henry S. Hu
(74) Attorney, Agent, or Firm—Ann M. Lee; Alan H. Thompson; Eddie E. Scott

(57) ABSTRACT

A synthetic method for preparation of hybrid inorganic/organic energetic nanocomposites is disclosed herein. The method employs the use of stable metal in organic salts and organic solvents as well as an organic polymer with good solubility in the solvent system to produce novel nanocomposite energetic materials. In addition, fuel metal powders (particularly those that are oxophilic) can be incorporated into composition. This material has been characterized by thermal methods, energy-filtered transmission electron microscopy (EFTEM), $N_2$ adsoprtion/desorption methods, and Fourier-Transform (FT-IR) spectroscopy. According to these characterization methods the organic polymer phase fills the nanopores of the material, providing superb mixing of the component phases in the energetic nanocomposite.

16 Claims, 3 Drawing Sheets

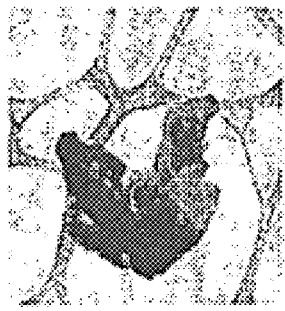 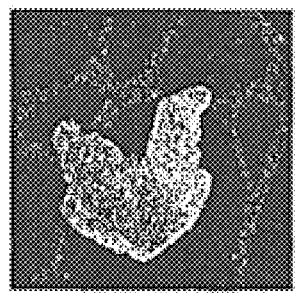 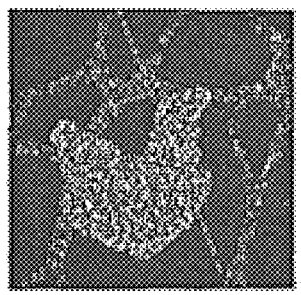
Figure 3a          Figure 3b          Figure 3c
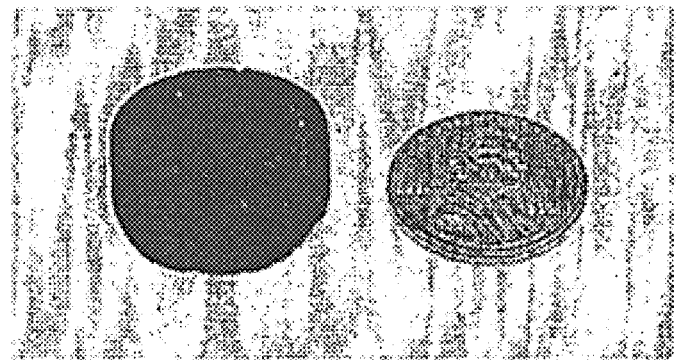
Figure 4

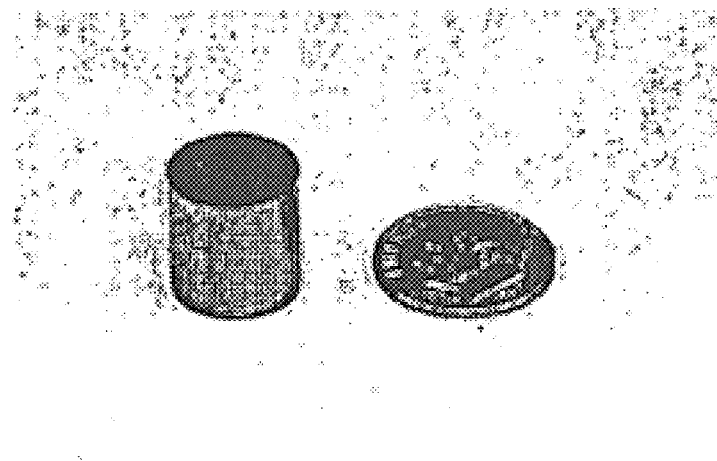
Figure 5
Figure 6
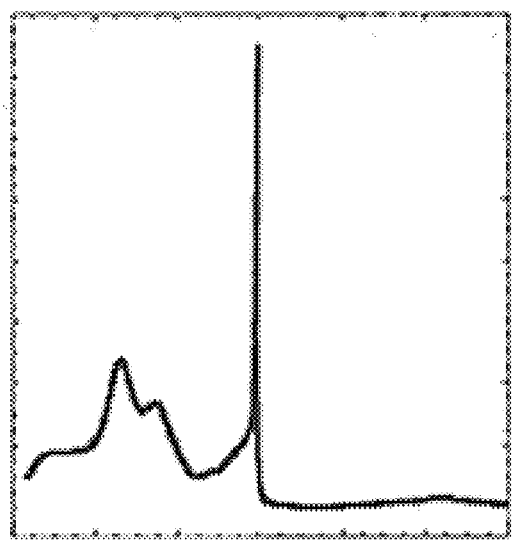

INORGANIC METAL OXIDE/ORGANIC POLYMER NANOCOMPOSITES AND METHOD THEREOF

CROSS-REFERENCE TO RELATED APPLICATION

This application is a divisional of application Ser. No. 10/186,468 filed on Jun. 28, 2002 now U.S. Pat. No. 6,712,917 entitled "Inorganic Metal Oxide/Organic Polymer Nanocomposites an Method Thereof"

The United States Government has rights in this invention pursuant to Contract No. W-7405-ENG-48 between the United States Department of Energy and the University of California for the operation of Lawrence Livermore National Laboratory.

BACKGROUND OF THE INVENTION

A composite is a mixture of at least two different component materials. Composites typically display properties that are not attainable in an of their individual components. A nanocomposite is a mixture of at least two different component materials where at least one of the components has one or more dimensions (length, width, or height) in the nanometer region. Nanocomposites very often display new, interesting, and useful properties that the conventional composite materials lack. The special properties displayed by nanocomposites are due to their small building blocks. The very small particles of the component materials have immense surface areas which result in there being a great deal of surface interfaces between them. This, in turn, influences the properties of the nanocomposites to a great extent. In conventional composites the materials have sizes on the micrometer scale with much less surface area and many fewer surface contacts and therefore, less influence on the overall properties of the materials.

SUMMARY OF THE INVENTION

Aspects of the invention include a method comprising: dissolving a metal ion salt in a solvent system to form a metal ion salt solution, wherein said solvent system is common to said metal ion salt and a given polymer; adding an epoxide to said metal ion salt solution to form an epoxide-containing metal ion salt solution; dissolving said polymer in said solvent system to form a polymer solution; adding a portion of the polymer solution to the epoxide-containing metal ion salt solution to form a polymer-containing, epoxide-containing metal ion salt solution; and stirring said a polymer-containing, epoxide-containing metal ion salt solution until said solution gels.

A further aspect of the invention includes a nanocomposite produced by the process comprising: dissolving a metal oxide salt in a solvent system to form a metal oxide salt solution, wherein said solvent system is common to said metal oxide salt and a polymer; adding an epoxide to said metal oxide salt solution to form an epoxide-containing metal oxide salt solution; dissolving said polymer in said solvent system to form a polymer solution; adding a portion of the polymer solution to the polymer-containing metal oxide salt solution to form a polymer-containing, epoxide-containing metal oxide salt solution; and stirring said polymer-containing, epoxide-containing metal oxide salt solution until said solution gels.

Another aspect of the invention includes a nanocomposite comprising: an inorganic sol-gel polymer phase comprising at least one metal-oxide and at least one epoxide; and an interpenetrating organic polymer phase entwined in said inorganic sol-gel phase.

BRIEF DESCRIPTION OF THE DRAWINGS

FIG. 3a is a Transmission electron micrograph of sol-gel $Fe_2O_3$/Viton xerogel on a carbon grid. The particle is ~600 nm in diameter.

FIG. 3b is an Energy filtered transmission electron micrograph (EFTEM) map for Fe in the sample.

FIG. 3c is an EFTEM map for fluorine.

FIG. 4 is a photo of a freestanding cast $Fe_2O_3$/UFG Al aerogel nanocomposite monolith next to a US penny.

FIG. 5 is a photo of pressed part of sol-gel $Fe_2O_3$/UFG Al/Viton A nanocomposite with a density of 1.93 g/cc (~75% TMD).

FIG. 6 shows the differential thermal analysis trace of sol-gel $Fe_2O_3$/UFG Al/Viton nanocomposite performed in room air atmosphere with a heating rate of 20° C./minute.

DETAILED DESCRIPTION OF THE INVENTION

Figure 1:
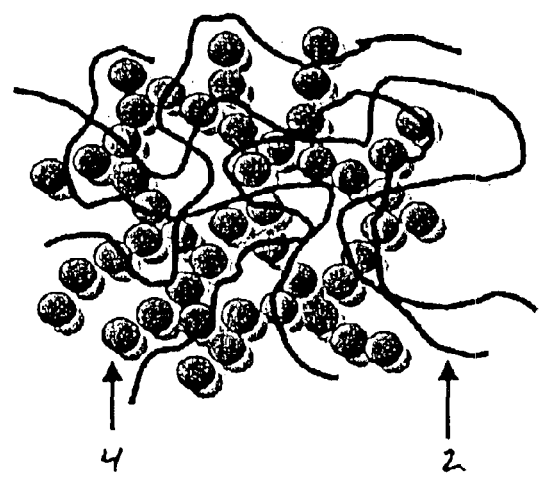
FIG. 1 is a schematic representation of the microstructure of a sol-gel derived $Fe_2O_3$/Viton A hybrid material.

David et al in Chem. Mater., 7,1957–1967, 1995, and in U.S. Pat. No. 5,252,654 have prepared inorganic/organic composite materials and characterized them extensively. Their results indicate that the structures contain interpenetrated or semi-interpenetrated organic and inorganic molecular networks intimately mixed.

Researchers have prepared nanocomposites for use as structural materials, coatings, catalysts, electronics, and biomedical applications. Consumers are just starting to see the effects of nanoscience in their everyday lives as commercial products in automobiles, homes, and personal care products utilizing nanocomposites which have recently been developed. However, one field with much less research in the areas of its nanoscience and nanocomposites, than the aforementioned fields, is that of energetic materials.

There are many different synthetic routes or methods to the production of nanocomposites. Some are made simply by powder blending of materials (one or more of which is on the nanoscale). Others are prepared by chemically linking nanosized materials together: Still others are prepared by simply trapping or depositing one material into the cavities, crevices, or pores of another material. Sometimes these methods require expensive processing equipment or a great deal of reaction time to ensure the homogeneous diffusion or blending of the materials.

The present invention involves a new synthetic route to the preparation of inorganic metal oxide/organic polymer nanocomposites involving the insitu-deposition of both the inorganic and organic phases from the same starting solution. The method can be applied to numerous metal oxide materials in many different solvents and hundreds of different polymers to make thousands of different nanocomposites. The method takes advantage of simplicity of the epoxide addition synthetic method for the preparation of nanostructured inorganic metal oxides, which involves a sol-gel technique, such as described and claimed in copending U.S. applications Ser. No. 09/587,234, filed Jun. 2, 2000 and Ser. No. 09/586,426, filed Jun. 2, 2000, each assigned to the same assignee and now abandoned.

Hybrid organic/inorganic nanocomposites comprise a sol-gel derived, metal oxide phase and molecularly entwined with an organic polymer phase. Nanometer-sized ultra fine grain (UFG) aluminum or commercially available micron-sized Al powder can be thoroughly mixed with the metal oxide phase if desired. The resulting materials can be processed into a variety of forms. Fine powders, pressed pellets, free standing cast monoliths, and thin films can be prepared using sol-gel methodology. One example of an inorganic metal oxide/organic polymer nanocomposite synthesis is the synthesis of an $Fe_2O_3$/Viton®A, A-100 nanocomposite. Another example is an $Fe_2O_3$/Viton®A, A-100/ Aluminum nanocomposite.

Viton®A, A-100 is an elastomer produced by Dupont Dow Elastomers, L.L.C. It is made of a partially fluorinated hydrocarbon polymer that contains water and is widely used in energetic materials as a binder. Viton®A, A-100 is effective as a dopant because it is soluble in a mixture of about 70/30 ethanol/acetone by weight (herein after referred to as the 70/30 solvent mixture), a solvent mixture that is also amenable to the synthesis of $Fe_2O_3$ gels. The $Fe_2O_3$ gels are in turn used to produce $Fe_2O_3$/Viton®A, A-100 nanocomposites and $Fe_2O_3$ Viton®A, A-100/Aluminum nanocomposites.

$Fe_2O_3$/Viton®A, A-100 nanocomposite materials can be formed by dissolving a known quantity of Viton®A, A-100 in the 70/30 solvent mixture to make a clear, colorless Viton®A, A-100 solution. A hydrated iron(III) salt, such as iron trichloride hexahydrate, is dissolved in a separate portion of the 70/30 solvent mixture in order to form an $Fe^{3+}$-containing solution; Water is necessary for effective gel preparation. The water can either come from the hydrated salt itself or, if an anhydrous salt is used, water may be added to the 70/30 solvent mixture. A mixed solvent system, where one of the solvents is a low molecular weight ketone, e.g., acetone, or low molecular weight ester is very important to successful nanocomposite synthesis. Viton®A, A-100 is soluble in very few solvents, i.e., low molecular weight ketones or esters, the only practical one for large-scale syntheses being acetone. The epoxide addition sol-gel method for iron-oxide gel materials is not possible in a pure acetone system but is realized in many other common inexpensive and non-toxic solvents. Mixed solvent systems, as long as one of the solvents is a low molecular weight ketone (e.g., acetone) or ester (e.g., ethyl acetate) are capable of dissolving Viton®A, A-100.

Gel formation is induced by adding a proton scavenger (i.e., a species capable of binding to a proton), such as propylene oxide, to the $Fe^{3+}$-containing solution. The Viton®A, A-100 solution is added about 10 minutes after the proton scavenger was added to the $Fe^{3+}$-containing solution. The resulting mixture is very viscous and is stirred to ensure homogeneous mixing. It is allowed to stand until gel formation takes place (typically a couple of hours). Once formed, the gel is a dark red monolith. The gel can be dried under atmospheric conditions or under supercritical conditions to yield both monoliths or powders. Under atmospheric drying (evaporation under ambient conditions) a xerogel gel is produced, while an aerogel is produced under supercritical drying (solvent exchange under the supercritical conditions). The drying process leads to precipitation of the dissolved Viton®A, A-100 polymer into the pores of the $Fe_2O_3$ solid. The materials described in the Preparation and Processing descriptions below have been characterized herein as described in the section heading Physical Characterization.

Energetic nanocomposite materials can be formed by adding a fuel metal powder material, such as, aluminum powder to the $Fe_2O_3$ Viton®A, A-100 synthetic process. Metals such as Zr, B, Mg, Ti and Al are oxophilic, i.e., they like to form oxides. Oxophilic-metals are effective fuel metal powder materials.

$Fe_2O_3$/Viton®A, A-100/ Aluminum energetic nanocomposite materials have been formed by adding ultra fine grained (UFG) aluminum powder with an average particle diameter equal to 40 nm to the homogeneous mixture described above before it is allowed to gel. The stirring action and the UFG nature of the aluminum allow it to form a stable dispersion in the sol-gel solution that upon aging forms a rigid black gel. Referring to FIG. 1, the sol-gel $Fe_2O_3$ phase 2 grows around and encapsulates the solid Al particles 4 to form an energetic nanocomposite.

Viton®A, A-100 is a highly fluorinated polymer, i.e., a fluoroelastomer, made commercially by du Pont. It is also known as vinylidine fluoride-hexafluoropropylene copolymer and is commonly used in energetic materials formulation. Viton®A, A-100 has several useful properties that make it an attractive component of energetic materials. Viton®A, A-100 has excellent heat and chemical resistance as well as possessing lubricant properties in processes such as pressing or extruding. It is also highly fluorinated (60–69% F by mass), which makes it a strong oxidizer under high temperature and pressure conditions. At high temperatures the fluoroelastomer decomposes to gaseous byproducts. Finally, it is one of the few highly fluorinated polymers that has significant solubility in common organic solvents. As previously stated, Viton®A, A-100 is soluble in several low molecular weight ketones, and esters.

A common solvent system can be used as both a solvent for Viton®A, A-100 and a medium for the sol-gel $Fe_2O_3$ synthesis. One solvent system that works well is a co-solvent that is 70% ethanol and 30% acetone by weight. In this co-solvent system sol-gel $Fe_2O_3$ can be made while keeping the Viton®A, A-100 dissolved. After formation of the porous $Fe_2O_3$ gel network slow evaporation of the solvent leads to precipitation of the Viton®A, A-100 polymer throughout the interconnected cavities of the material to, in effect, entwine the organic polymer in the inorganic glass. This structure is an interpenetrating network of both the organic and inorganic components, like that shown in FIG. 1. The degree of mixing and contact between the two phases is superb. Any type of mechanical mixing of the two preformed components could not prepare this type of material. Physical characterization of the hybrid $Fe_2O_3$/Viton®A, A-100 material indicates the degree of mixing between the phases.

Figure 2:
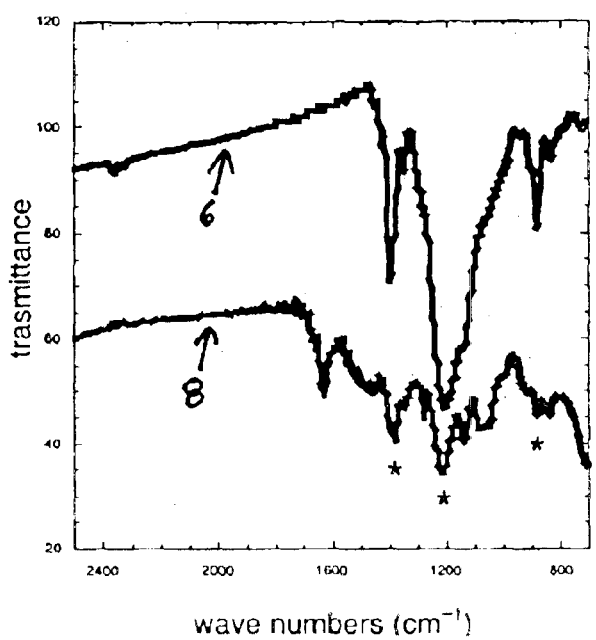
FIG. 2 is the Fourier Transform infra-red (FT-IR) spectra of Viton A and a sol-gel $Fe_2O_3$/Viton A xerogel nanocomposite.

Referring to FIG. 2, the Fourier Transform infra-red (FT-IR) spectra of Viton®A, A-100 6 and a sol-gel $Fe_2O_3$/ Viton®A, A-100 xerogel nanocomposite 8 are shown. There are clear strong vibrational bands at 883 $cm^{-1}$, 1205 $cm^{-1}$, and 1398 $cm^{-1}$ in the spectra of both materials (note asterisks in FIG. 2); This shows the synthetic process described above has resulted in a sol-gel $Fe_2O_3$ material that contains Viton®)A, A-100. Even though the FT-IR evidence indicates the presence of Viton®A, A-100 in the composite material, it provides no information as to the distribution and degree of mixing of the fluoroelastomer in the glassy inorganic matrix. Measurements of the pore volume and surface area of the inorganic/organic nanocomposites provide that information.

Nitrogen adsorption/desorption experiments were performed on sol-gel $Fe_2O_3$/Viton®A, A-100 xerogel and aerogel composites that were 80% $Fe_2O_3$/20% Viton®A, A-100 and 100% $Fe_2O_3$/0% Viton®A, A-100 by weight. The surface area, pore volume, and average pore size for the three materials are shown in Table 1.

TABLE 1

Summary of $N_2$ adsorption/desorption data for sol-gel $Fe_2O_3$/Viton ® A, A-100 hybrid materials.

| Material | B.E.T. Surface Area (m²/g) | B.H.J. Pore Volume (cm³/g) |
|---|---|---|
| $Fe_2O_3$ xerogel | 453 | 0.25 |
| $Fe_2O_3$/Viton ® A, A-100 xerogel | 6.5 | <0.005 |
| $Fe_2O_3$ aerogel | 506 | 3.55 |
| $Fe_2O_3$/Viton ® A, A-100 aerogel | 219 | 1.66 |

The nitrogen adsorption data in Table 1 indicates that the Viton®A, A-100-containing samples have significantly smaller surface areas and pore volumes than control samples with no polymer present. This is most obvious in the xerogel sample and occurs to a smaller extent in the more open network aerogel material, wherein more open network refers to larger pore diameters and pore volumes. This observation is consistent with the fact that the Viton®A, A-100 in the dried samples has effectively filled in the pores of the $Fe_2O_3$ sol-gel nanostructure (as depicted in FIG. 1).

Further interpretation of this data suggests that the Viton®A, A-100 is well distributed throughout the nanostructure. If instead, the Viton®A, A-100 were present in large (μm-sized) localized domains there would logically be significant areas consisting of the highly porous sol-gel $Fe_2O_3$, and one would expect both the surface area and pore volumes to be much higher, especially for the xerogel sample. The extremely uniform and fine entrainment of Viton®A, A-100 into the porous $Fe_2O_3$ network results in a true nanocomposite. That is, the size of the components and the dimensions of contact between those phases are in the tens of nanometers range (i.e., on the order of the size of the pore diameters (15–40 nm)).

Energy filtered transmission electron microscopy (EFTEM) at LLNL has been utilized to more fully elucidate the close contact between Viton®A, A-100 and $Fe_2O_3$ in this material. EFTEM can be used to construct an elemental specific map of a given image. The EFTEM technique is performed using conventional TEM microscopy in conjunction with very precise magnetic filters (see Mayer, J. *European Microscopy and Analysis* 1993, 21–23). Use of the magnetic image filtering system allows the construction of an image from inelastically scattered beam electrons of a given energy. The energy of the inelastically scattered electrons is related to the identity of the elements that it interacts with. By only allowing scattered electrons, of, a given energy, through the filter, elemental specific maps of an image can be identified. FIG. 3a shows an EFTEM image of a $Fe_2O_3$/Viton®A, A-100 xerogel, FIG. 3b shows the EFTEM map for fluorine and FIG. 3c shows the EFTEM map for iron. These images show that fluorine, from the Viton®A, A-100, and iron, from the $Fe_2O_3$ xerogels, are uniformly present throughout the sample. The EFTEM results indicate that F-containing Viton®A, A-100 to be present throughout the sample indicating superb mixing of both the inorganic and organic phases (as depicted in FIG. 1).

The sol-gel method allows production of materials with special shapes such as monoliths, fibers, films, and powders of uniform and very small particle sizes. Very fine powders of the hybrid sol-gel $Fe_2O_3$/UFG Al/Viton®A, A-100 xerogel composites have been produced. Free-standing dry energetic composite pellets have been produced by ambient temperature or supercritical drying of wet gels without any pressing. Referring to FIG. 4, a $Fe_2O_3$/UFG Al aerogel composite next to an US penny is shown. The synthesis and shape casting of low-density energetic materials compositions to make monolithic materials in a variety of shapes and sizes is possible.

Pressing of nanocomposite powders into dense monoliths produces a material with a high energy density. An energetic nanocomposite powder comprising (all values are weight percentages) 40% sol-gel $Fe_2O_3$, 38% UFG Al, 11% Viton®A, A-100, and 11% organic oligomers was prepared as described herein in the section labeled Experimental. The organic component of the materials is the byproduct of the sol-gel synthesis method. A portion of this powder was pressed using a remote apparatus, at a temperature of 80° C., to a pressure of 30,000 psi, with a dwell time of 3 minutes. FIG. 5 is a photo of a pressed part of sol-gel $Fe_2O_3$/UFG Al/Viton®A, A-100 nanocomposite with a density of 1.93 g/cc next to a US dime. The density value is between 74–77% of theoretical maximum density (TMD) for the material which is 2.5–2.6 g/cc.

The sol-gel process is very amenable to dip-, spin-, and spray-coating technologies to coat surfaces. Various substrates have been dip-coated to make sol-gel $Fe_2O_3$/Al/Viton®A, A-100 coatings. The energetic coating dries to give a nice adherent film. Preliminary experiments indicate that films of the hybrid material are self-propagating when ignited by thermal stimulus. Some of the thermal properties of the sol-gel $Fe_2O_3$/Al/Viton®A, A-100 nanocomposite have been investigated. FIG. 6 contains the differential thermal analysis (DTA) trace of this material in ambient air. The sol-gel nanocomposite DTA has thermal events at ~260, ~290, and ~590° C. The two lower temperature events have been determined to relate to a phase transition and crystallization of the amorphous $Fe_2O_3$ phase. The exotherm at ~590° C. corresponds to the thermite reaction (confirmed by powder x-ray diffraction of reaction products). This exotherm is very narrow and sharp, possibly indicating a very rapid reaction. The thermite reaction takes place at a temperature markedly below the melt phase of bulk aluminum ($t_m$=660° C.). It is commonly thought that in conventional thermites, the thermite reactions are initiated by the melting or decomposition of one of the constituent phases (See Wang, L. L.; Munir, Z. A.; Maximov, Y. M. J. *Mater. Sci.* 1993, 28, 3693–3708 and Mei, J.; Halldearn, R. D.; Xiao, P. *Scripta Materialia*, 1999, 41(5), 541–548).

Phenomenological burn observations indicate that the material burns very rapidly and violently, essentially to completion, with the generation of significant amounts of gas. This reaction is very exothermic and results in the production of very high temperatures, intense light, and pressure from the generation of the gaseous byproducts of Viton®A, A-100 decomposition.

Preparation of sol-gel $Fe_2O_3$/Al/Viton A hybrid organic/inorganic energetic nanocomposite: Ferric chloride hexahydrate, $FeCl_3 \cdot 6H_2O$ (98%), and acetone were obtained from Aldrich Chemical Co. and used as received. Absolute (200 proof) ethanol from Aaper was used as received. Viton fluoroelastomer was acquired from E.I. Du Pont de Nemours Chemical Co. The ultra fine grain aluminum (UFG Al) used in this study was provided by the Indian Head Division of the Naval Surface Warfare Center and was prepared via dynamic vapor phase condensation. Transmission electron microscopy analysis indicated that the UFG had a large distribution of particle sizes from ~10 to ~100 nm in diameter. The aluminum content of this material was ~70% by weight as determined by thermal gravimetric analysis.

In a typical experiment, 1.34 g of $FeCl_3 \cdot 6H_2O$ (5.0 mmol) was dissolved in 16 g of a mixed solvent (70% ethanol/30% acetone by weight) to give a clear red-orange solution that remained unchanged upon storage, under room conditions, for several months. If instead, a 4.8 g portion of propylene oxide was added to the solution it turned dark red-brown color (a variety of different 1,2- and 1,3-epoxides are suitable for this step of the synthesis). The color change is accompanied by significant heat generation, which in some cases led to rapid boil over of the synthesis solution. To prevent a flash boil the 4.8 g of propylene oxide was added in four separate 4.8 g amounts over the period of about one hour.

A Viton®A-containing solution was prepared by dissolving 5 g of Viton®A, A-100 A fluoroelastomer in 85 g of acetone (although acetone is used in this description, Viton®A, A-100 is soluble in a variety of low molecular weight esters and ketones, which are also suitable solvents for this synthesis). After the Viton®A, A-100 had completely dissolved 50 g of ethanol was added to the solution. Four grams of this solution was added to the propylene oxide containing Fe (III) solution from the previous paragraph. Then 0.48 g of UFG Al was added to this solution while stirring with a magnetic stir bar. The resulting mixture was stirred until the gelation occurred. Typical gel times were between 15–240 minutes.

Some nanocomposites were also made without aluminum and some were prepared using conventional $\mu$m-sized Al. Other oxophillic fuel metal powders (e.g., boron, magnesium, zirconium etc.) could be used effectively in this process. In addition, this method is versatile enough that it could be extended to other sol-gel oxide systems (e.g., $MoO_3$, NiO, CoO, $WO_3$, $WO_2$, $MoO_2$, $MnO_2$, CuO, $V_2O_5$, $Ta_2O_5$). Finally, this is a general method for the incorporation of polymers into inorganic matrices with the only requirement being the solubility of the polymer in a chosen solvent. Thus, the general application of this method to a multitude of other polymers or organic molecules is clearly possible.

Processing $Fe_2O_3$/A l/Viton A and $Fe_2O_3$/Viton A nanocomposites.

Aerogel samples were processed in a Polaron™ supercritical point drier. The solvent liquid in the wet gel pores was exchanged for $CO_2(l)$ for 3–4 days, after which the temperature of the vessel was ramped up to ~45° C., while maintaining a pressure of ~100 bars. The vessel was then depressurized at a rate of about 7 bars per hour. For aerogel processing, polyethylene vials were used to hold the gels during the extraction process. This was done because much less monolith cracking was observed than when $Fe_2C_3$ gels were processed in glass vials. Drying in a fume hood at room temperature for 14–30 days resulted in xerogel samples. Under these conditions high vapor pressure solvents, like ethanol, were evaporated and the wet gels were converted to xerogels. Drying at elevated temperatures under flowing $N_2$ atmosphere also produced xerogels. Inert atmospheric drying of xerogels was done under ambient and elevated (~100° C.) conditions.

The wet pyrotechnic nanocomposites cannot be ignited until the drying process is complete. However, once dry, the materials will burn rapidly and vigorously if exposed to extreme thermal conditions. In addition, the autoignition of energetic nanocomposites has been observed upon rapid exposure of hot ~100° C. material to ambient atmosphere.

Physical characterization of $Fe_2O_3$/Al/Viton®A, A-100 and $Fe_2O_3$/Viton®A, A-100 nanocomposites. Fourier transform-infrared (FT-IR) spectra were collected on pressed pellets containing KBr (IR-grade) and a small amount of solid sample. The spectra were collected with a Polarism™ FTIR spectrometer. Surface area determination, pore volume and size analysis were performed by BET (Brunauer-Emmett-Teller) and BJH (Barrett-Joyner-Halenda) methods using an ASAP 2000 Surface area Analyzer (Micromeritics Instrument Corporation). Samples of approximately 0.1–0.2 g were heated to 200° C. under vacuum ($10^{-5}$ Torr) for at least 24 hours to remove all adsorbed species. Nitrogen adsorption data was taken at five relative pressures from 0.05 to 0.20 at 77K, to calculate the surface area by BET theory, Bulk densities of both xerogels and aerogels were determined by measuring the dimensions and mass of each monolithic sample.

High resolution transmission electron microscopy (HRTEM) of dry $Fe_2O_3$ gels was performed on a Philips CM300FEG operating at 300 Kev using zero loss energy filtering with a Gatan energy Imaging Filter (GIF) to remove inelastic scattering. The images where taken under BF (bright field) conditions and slightly defocused to increase contrast. The images were also recorded on a 2K×2K CCD camera attached to the GIF. Differential thermal analysis (DTA) was performed on energetic nanocomposites that were contained in an open platinum pan. Samples were heated under both room and inert (nitrogen) atmospheres from room temperature to 1250° C. at a heating rate of 20° C./min. Powder X-ray diffraction (PXRD) experiments were performed on samples powders mounted on quartz slides and loaded into a CPS120 Curved Position Sensitive Detector unit that utilizes CuK$\alpha$ radiation.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

What is claimed is:

1. A nanocomposite produced by the process comprising:

dissolving a metal ionsalt in a solvent system to form a metal ion salt solution, wherein said solvent system is common to said metal ion salt and a polymer;

adding an epoxide to said metal ion salt solution to form an epoxide-containing metal ion salt solution;

dissolving said polymer in said solvent system to form a polymer solution;

adding a portion of the polymer solution to the epoxide-containing metal ion salt solution to form a polymer-containing, epoxide-containing metal ion salt solution; and stirring said a polymer-containing, epoxide-containing metal ion salt solution until said solution gels.

2. The nanocomposite produced by the process recited in claim 1, further comprising:

adding a fuel metal powder to said polymer-containing, epoxide-containing metal ion salt solution while stirring, wherein said addition of the fuel metal powder occurs before said polymer-containing, epoxide-containing metal ion salt solution gels.

3. The nanocomposite recited in claim 1, wherein said metal ion salt is $Fe_2O_3$.

4. The nanocomposite produced by the process recited in claim 1, wherein said polymer is a fluoroelastomer.

5. The nanocomposite produced by the process recited in claim 2, wherein said fluoroelastomer is vinylidene fluoride-hexafluoropropylene copolymer.

6. The nanocomposite produced by the process recited in claim 4, wherein said flouroelastomer is soluble in said solvent system.

7. The nanocomposite produced by the process recited in claim 1, wherein said solvent system is a mixture of ethanol and acetone.

8. The nanocomposite produced by the process recited in claim 2, wherein said fuel metal powder is Al, Mg, B, Ti, Zr or mixtures thereof.

9. The nanocomposite produced by the process recited in claim 2, wherein said fuel metal powder is ultra fine grain aluminum.

10. A nanocomposite comprising:
   an inorganic sol-gel polymer phase comprising at least one metal-oxide and at least one epoxide; and
   an interpenetrating organic polymer phase entwined in said inorganic sol-gel phase.

11. The nanocomposite recited in claim 10, wherein said inorganic sol-gel polymer phase further comprises:
   A fuel metal powder.

12. The nanocomposite recited in claim 10, wherein said metal oxide is $Fe_2O_3$.

13. The nanocomposite recited in claim 10, wherein said polymer is a fluoroelastomer.

14. The nanocomposite recited in claim 13, wherein said fluoroelastomer is vinylidene fluoride-hexafluoropropylene copolymer.

15. The nanocomposite recited in claim 11, wherein said fuel metal powder is Al, Mg, B, Ti, Zr or mixtures thereof.

16. The nanocomposite recited in claim 11, wherein said fuel metal powder is ultra fine grain aluminum.

* * * * *